United States Patent
Tabuchi

(10) Patent No.: US 11,093,190 B2
(45) Date of Patent: Aug. 17, 2021

(54) IMAGE FORMING APPARATUS AND CONTROL METHOD THEREOF FOR CONTINUING IMAGE FORMING OPERATIONS IN A CASE WHERE A MEMORY HAS A FAILURE

(71) Applicant: CANON KABUSHIKI KAISHA, Tokyo (JP)

(72) Inventor: Hidetaka Tabuchi, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/721,508

(22) Filed: Dec. 19, 2019

(65) Prior Publication Data
US 2020/0210124 A1 Jul. 2, 2020

(30) Foreign Application Priority Data
Dec. 28, 2018 (JP) .............................. JP2018-247628

(51) Int. Cl.
G06F 3/12 (2006.01)
H04N 1/00 (2006.01)

(52) U.S. Cl.
CPC .......... G06F 3/1267 (2013.01); G06F 3/1204 (2013.01); G06F 3/1241 (2013.01); G06F 3/1259 (2013.01); G06F 3/1261 (2013.01); H04N 1/00408 (2013.01)

(58) Field of Classification Search
CPC .... G06F 3/1267; G06F 3/1204; G06F 3/1241; G06F 3/1259; G06F 3/1261; H04N 1/00408

USPC .......................................................... 358/1.1
See application file for complete search history.

(56) References Cited

U.S. PATENT DOCUMENTS

| | | | | |
|---|---|---|---|---|
| 6,089,765 A | * | 7/2000 | Mori | G06F 3/1211 400/61 |
| 6,128,096 A | * | 10/2000 | Furuya | G06K 15/02 358/1.17 |
| 2008/0068656 A1 | * | 3/2008 | Sato | H04N 1/32635 358/1.16 |
| 2011/0161746 A1 | * | 6/2011 | Ooya | G06F 3/1234 714/57 |
| 2013/0047014 A1 | * | 2/2013 | Ise | G06F 3/1229 713/320 |
| 2015/0029547 A1 | * | 1/2015 | Fukudome | G06F 3/1204 358/1.15 |

FOREIGN PATENT DOCUMENTS

JP 2008-73921 A 4/2008

* cited by examiner

*Primary Examiner* — Allen H Nguyen
(74) *Attorney, Agent, or Firm* — Canon U.S.A., Inc. I.P. Division

(57) ABSTRACT

An image forming apparatus includes a first storage unit, a second storage unit, and a control unit that is configured to cause received print data to be stored in the first storage unit and the second storage unit. The control unit causes a printer unit to perform a print to print the stored print data in the first storage unit in a case where the first storage unit is in a normal state, and causes a message to be displayed in a case where the first storage unit has a functional failure.

12 Claims, 6 Drawing Sheets

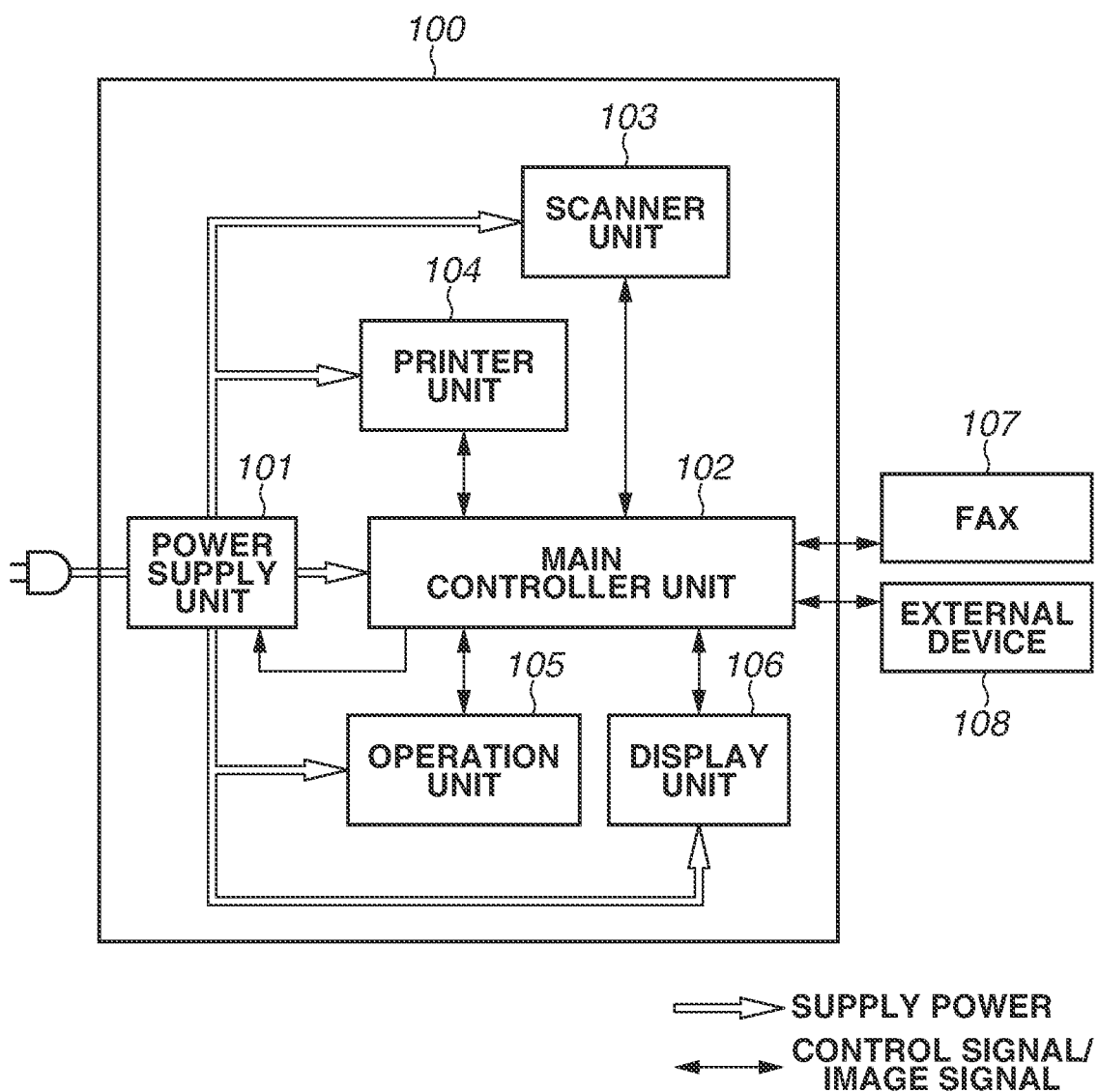

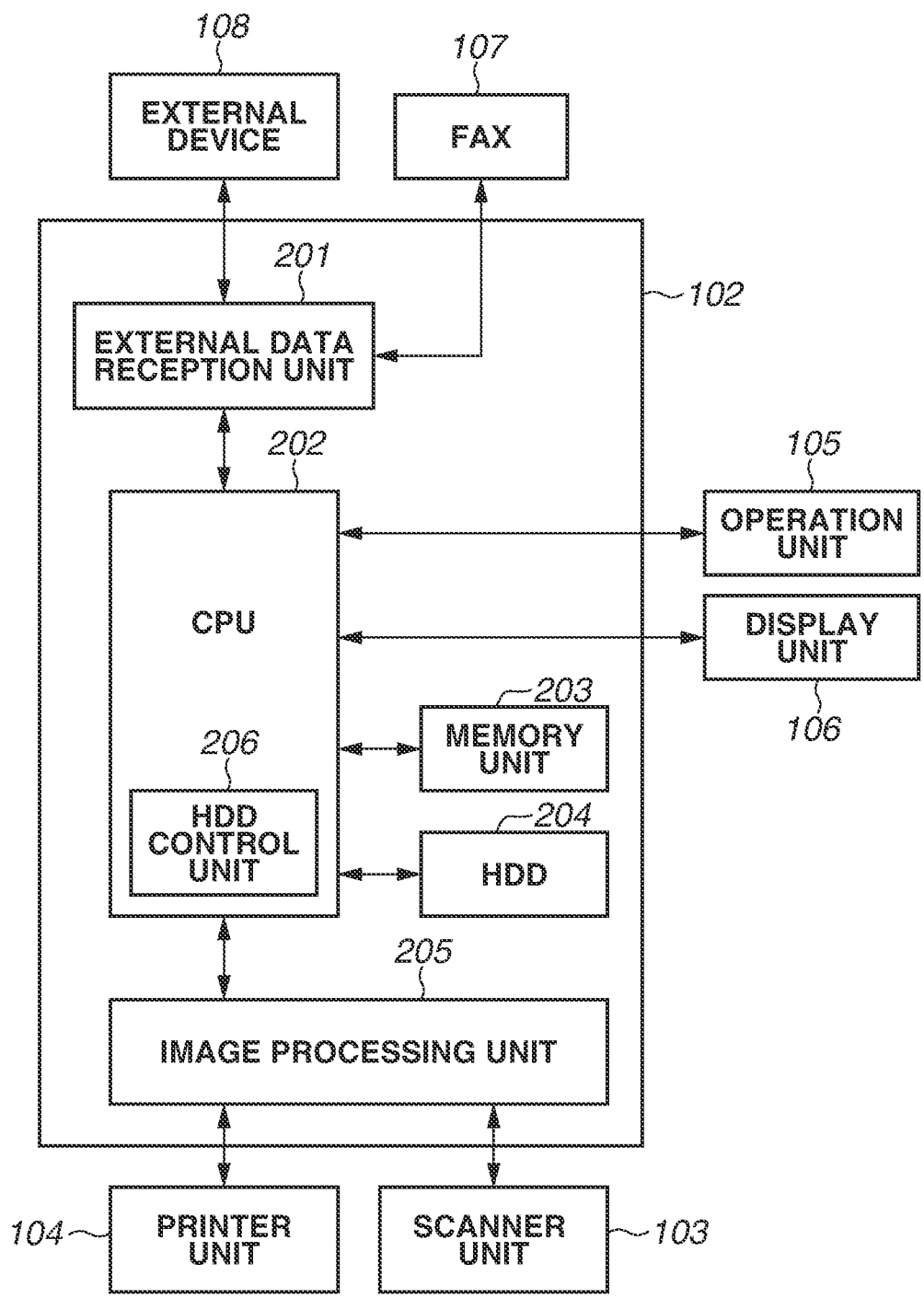

FIG.4

| FUNCTION | STATE OF HDD | |
| --- | --- | --- |
| | NORMAL | FAILURE |
| NORMAL COPY | ○ | ○ |
| LAN PRINT | ○ | ○ |
| FAX FUNCTION | ○ | × |
| SCANNING AND TRANSMISSION FUNCTION | ○ | × |
| USE OF DESTINATION | ○ | × |

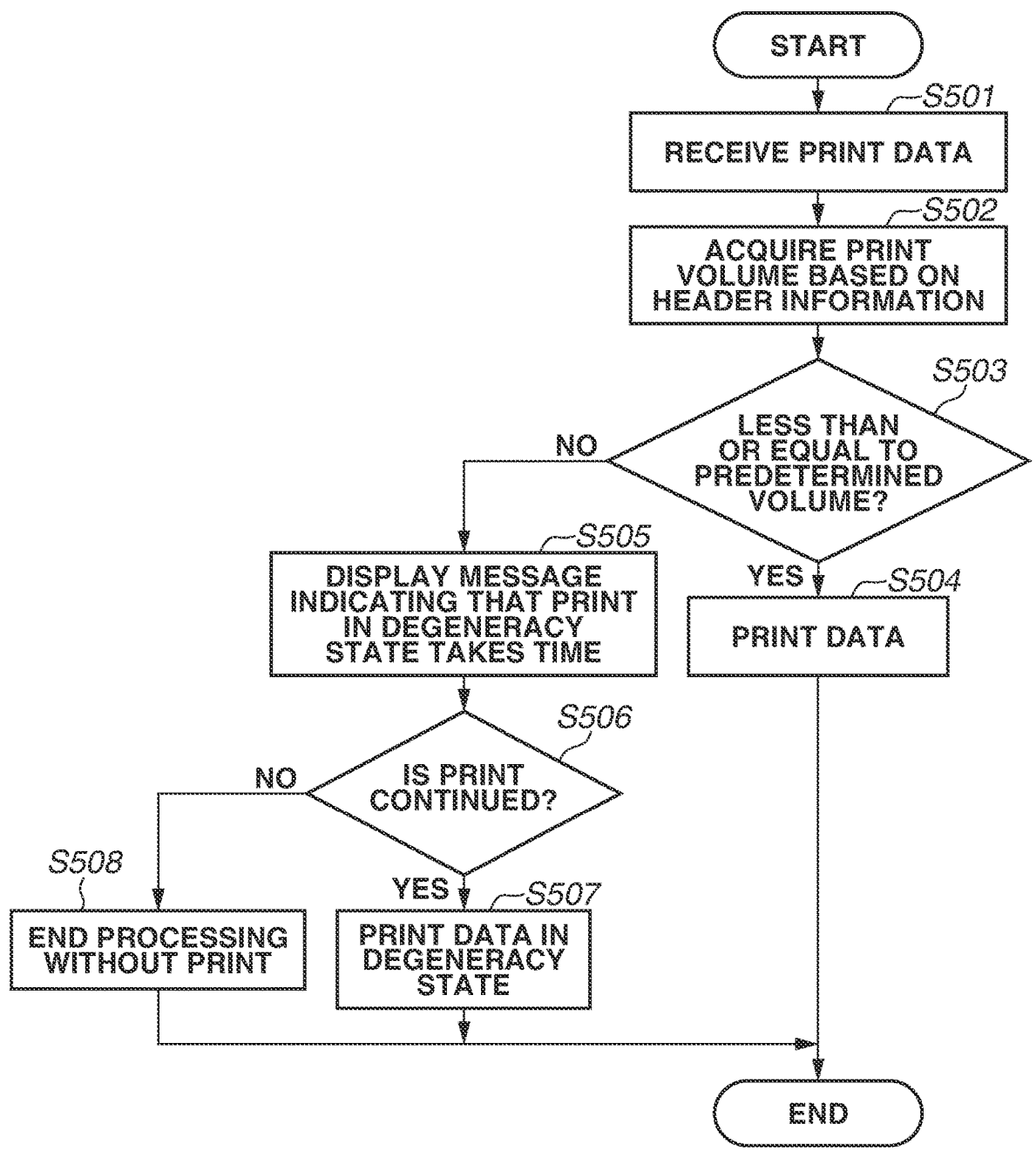

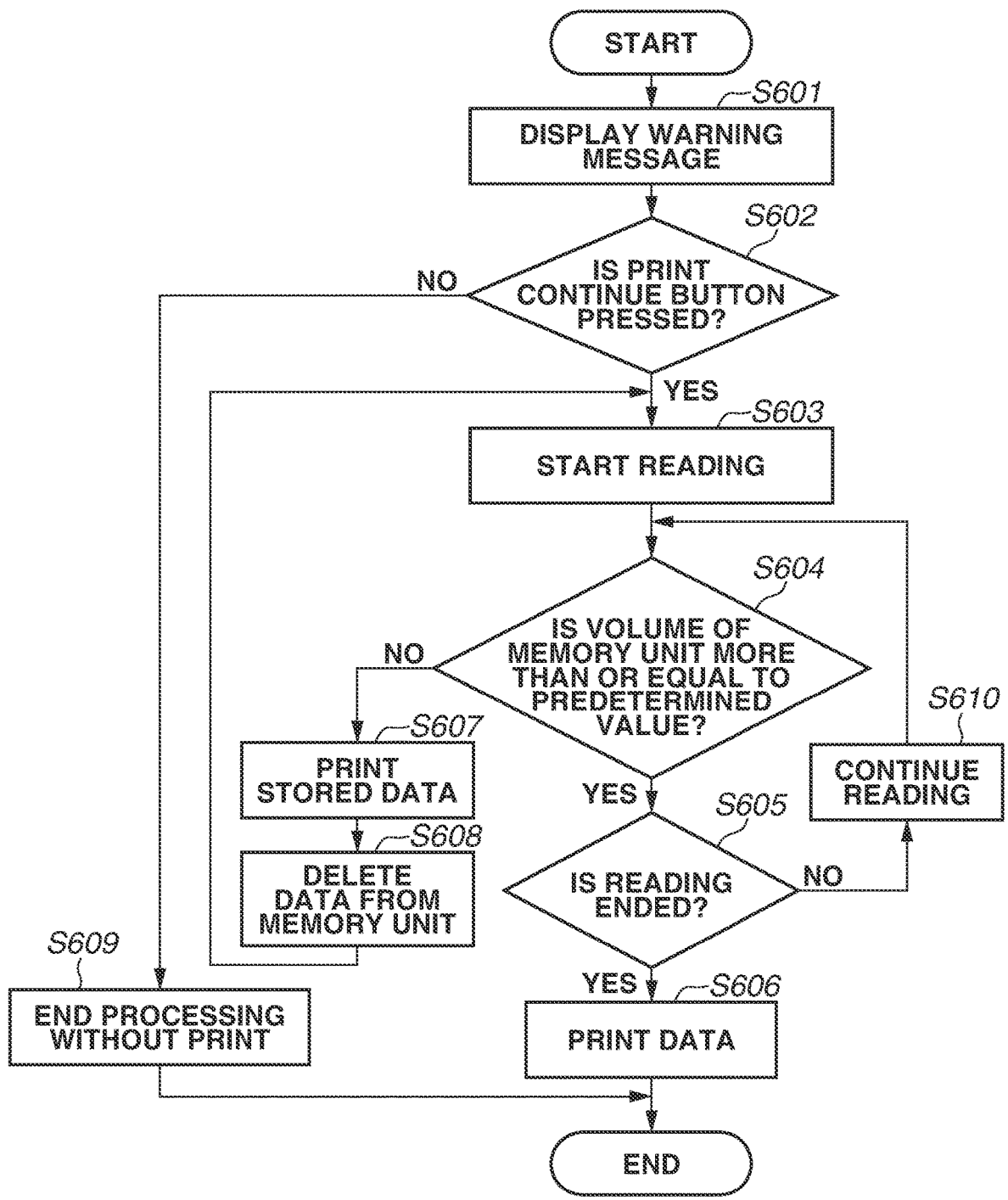

IMAGE FORMING APPARATUS AND CONTROL METHOD THEREOF FOR CONTINUING IMAGE FORMING OPERATIONS IN A CASE WHERE A MEMORY HAS A FAILURE

BACKGROUND

Field

The present disclosure relates to an image forming apparatus and a method for controlling the image forming apparatus.

Description of the Related Art

A hard disk drive (HDD) requires a highly precise mechanical control in a drive unit, and uses a magnetic substance on a storage medium. The HDD is thus vulnerable to changes in circumstantial conditions, such as vibration, and is fragile in general. The HDD is known to be one of the devices in an image forming apparatuses that has frequent hardware failures. Japanese Patent Application Laid-Open No. 2008-73921 discusses a technique that enables continuous printing using another memory other than the HDD in the image forming apparatus in a case where the HDD has a functional failure.

SUMMARY

According to various embodiments of the present disclosure, an image forming apparatus includes a first storage unit, a second storage unit, and a control unit that is configured to cause received print data to be stored in the first storage unit and the second storage unit, and to cause a printer unit to perform a print to print the stored print data in the first storage unit in a case where the first storage unit is in a normal state, and to cause a message to be displayed in a case where the first storage unit has a functional failure.

Further features will become apparent from the following description of exemplary embodiments with reference to the attached drawings.

BRIEF DESCRIPTION OF THE DRAWINGS

FIG. 1 is a block diagram illustrating a configuration example of an image forming apparatus according to one embodiment.

FIG. 2 is a block diagram illustrating a configuration example of a main controller unit according to one embodiment.

FIG. 4 is a table illustrating availability of functions based on a state of the HDD according to one embodiment.

FIG. 5 is a flowchart executed during local area network (LAN) print performed in a case where the HDD has a functional failure according to one embodiment.

FIG. 6 is a flowchart executed during normal copying performed in the case where the HDD has the functional failure according to one embodiment.

DESCRIPTION OF THE EMBODIMENT

Figure 3A:
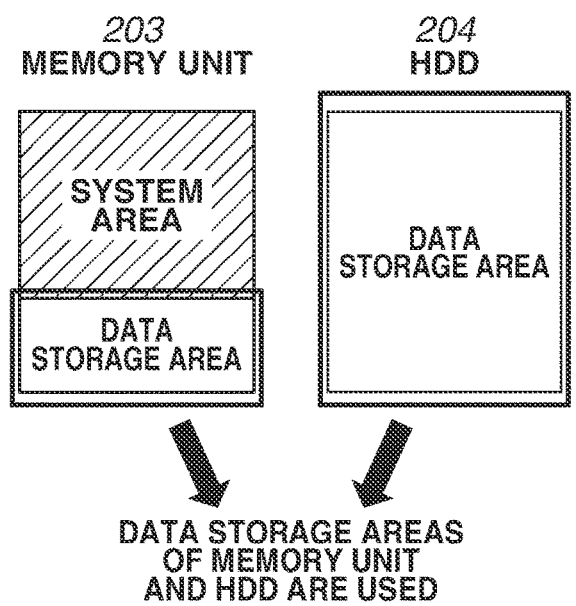
FIGS. 3A and 3B are block diagrams illustrating a print data storage method based on a state of a hard disk drive (HDD) according to one embodiment.

FIG. 1 is a block diagram illustrating a configuration example of an image forming apparatus 100 according to an exemplary embodiment of the present disclosure. The image forming apparatus 100 is a multi function peripheral (MFP) which has a plurality of functions such as a printing function, a scanning function, a copy function, and a facsimile (FAX) function. The image forming apparatus 100 includes a power supply unit 101, a main controller unit 102, a scanner unit 103, a printer unit 104, an operation unit 105, and a display unit 106. Components included in the image forming apparatus 100 are only examples. The image forming apparatus 100 is connected to a FAX 107 and an external device 108. The external device 108 is, for example, a personal computer.

The power supply unit 101 supplies power to the respective units of the image forming apparatus 100. The scanner unit 103 optically reads an image on a document and generates image data. The printer unit 104 forms an image on a recording medium (e.g., a sheet) using electrophotography. The main controller unit 102 processes image data input from the scanner unit 103, the external device 108, or the FAX 107, and outputs the processed image data to the printer unit 104. The main controller unit 102 further controls a general operation of the image forming apparatus 100, which includes the scanner unit 103 and the printer unit 104, based on an instruction input by a user via the operation unit 105. The display unit 106 can display a state of the image forming apparatus 100 (e.g., a remaining number of sheets to be printed and information about occurring error). The display unit 106 can also display functions that are available in the image forming apparatus 100. The functions can be selected on the display unit 106.

The image forming apparatus 100 includes three kinds of operation modes including a job mode, a standby mode, and a sleep mode. In the job mode, the image forming apparatus 100 can perform copying and scanning operations, and supplies electricity to all the units in the image forming apparatus 100. In the standby mode, the image forming apparatus 100 waits for a job, and supplies electricity to the units other than the scanner unit 103 and the printer unit 104. In the sleep mode, the image forming apparatus 100 only operates minimal units including a communication unit to communicate with an outer device (e.g., the FAX 107), and the main controller unit 102.

Upon receiving a job from any of the operation unit 105, the external device 108, or the FAX 107, the image forming apparatus 100 enters the job mode, and performs a print. When the job is completed, the image forming apparatus 100 shifts to the standby mode. Thereafter, if the image forming apparatus 100 is not used after elapse of a certain time or is directed to shift into the sleep mode by the operation unit 105, the image forming apparatus 100 shifts to the sleep mode.

FIG. 2 is a block diagram illustrating a configuration example of the main controller unit 102 in FIG. 1. The main controller unit 102 includes an external data reception unit 201, a central processing unit (CPU) 202, a memory unit 203, a hard disk drive (HDD) 204, and an image processing unit 205.

The external data reception unit 201 receives print data from the external device 108 or the FAX 107 connected to the image forming apparatus 100.

The image processing unit 205, which is connected to the CPU 202, the printer unit 104, and the scanner unit 103, executes image processing such as color space conversion on a digital image output from the scanner unit 103, and outputs the processed digital image to the CPU 202. The image processing unit 205 executes the image processing, such as the color space conversion, on the digital image output from the scanner unit 103, converts the processed image to bitmap data, and outputs the bitmap data to the printer unit 104.

The CPU 202, which is a control unit, controls an entire image forming apparatus 100. The CPU 202 receives signals from the operation unit 105, a FAX line 112, and the external device 108 to achieve functions including a copy function, a printing function, and a FAX function.

The CPU 202 includes an HDD control unit 206. The HDD control unit 206 controls the HDD 204. The CPU 202 further has a function of detecting a state of the HDD 204, and determines a storage area of print data based on the detected state of the HDD 204.

The memory unit 203, which is a volatile semiconductor memory such as a double date rate synchronous dynamic random access memory (DDR SDRAM), is a volatile storage device that temporarily stores jobs to be executed by the CPU 202. The memory unit 203 further has a data storage area where print data is stored.

The HDD 204 is a nonvolatile storage device to store data, and writes or reads print image data processed in the image forming apparatus 100. A storage device (e.g., a solid state drive (SSD)) may be used instead of the HDD 204. The HDD 204 may be installed outside the image forming apparatus 100. A volume of the HDD 204 is larger than a volume of the memory unit 203.

In FIG. 2, the CPU 202 and the HDD 204 are directly connected to each other. However, a disk array device (not illustrated), which is separated from the CPU 202, may be used to control the HDD 204 depending on the volume of the CPU 202. The data storage area of the HDD 204 is set to be larger than that of the memory unit 203. The data storage areas in the HDD 204 and the memory unit 203 can store data up to respective predetermined data volume.

Figure 3B:
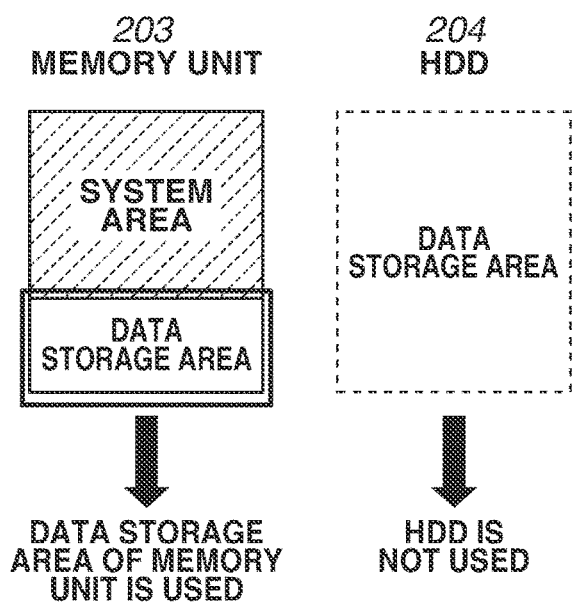

FIGS. 3A and 3B are diagrams illustrating configuration examples of the memory unit 203 and the HDD 204. The memory unit 203 includes a system area and a data storage area. The HDD 204 includes a data storage area. The CPU 202 stores print data in the memory unit 203 or the HDD 204 based on a state of the HDD 204.

As illustrated in FIG. 3A, in a case where the HDD 204 does not fail and is in a normal state, the CPU 202 stores the print data in the data storage area of the memory unit 203 and the data storage area of the HDD 204 after receiving the print data.

As illustrated in FIG. 3B, in a case where the HDD 204 has a functional failure, the CPU 202 stores the print data in the memory unit 203 instead of using the HDD 204 after receiving the print data.

FIG. 4 illustrates availability of functions based on a state of the HDD 204. In the image forming apparatus 100, the availability of the functions is different between the normal state and the failure state of the HDD 204. In FIG. 4, available functions are marked with ○, and unavailable functions are marked with x.

The image forming apparatus 100 includes a normal copy function, a local area network (LAN) printing function, the FAX function, a scanning and transmission function, and a destination using function. The normal copy function prints image data read by the scanner unit 103. The LAN printing function receives data from the external device 108 (e.g., a personal computer) via a network and prints the received data. The FAX function prints the data received from the FAX 107 via an external public line. The scanning and transmission function stores image data read by the scanner unit 103 and writes the image data in the HDD 204, and transmits the image data to the external device 108. The destination using function uses a destination during usage of the FAX function.

In the case where the HDD 204 is in the normal state, the image forming apparatus 100 can use all the above-described functions. When receiving an instruction from the operation unit 105 or a job from the external device 108, the image forming apparatus 100 performs an operation based on each function and settings thereof.

In the case where the HDD 204 has the functional failure, the image forming apparatus 100 can use only the normal copy function and the LAN printing function, and cannot use the other functions. The image forming apparatus 100 is set such that it does not accept an operation from the operation unit 105 with respect to unavailable functions.

FIG. 5 is a flowchart illustrating a method for controlling the LAN printing function of the image forming apparatus 100 in the case where the HDD 204 has the functional failure. In the case where the HDD 204 has the functional failure, the image forming apparatus 100 receives print data from the external device 108 and prints the print data through the processing in FIG. 5.

In step S501, the CPU 202 receives the print data from the external device 108. In step S502, the CPU 202 acquires a volume of the print data based on header information about the print data received from the external device 108.

In step S503, the CPU 202 determines whether the volume of the print data is less than or equal to a storable data volume of the memory unit 203. The storable data volume is a remaining volume for storing data. If the volume of the print data is less than or equal to the storable data volume of the memory unit 203 (YES in step S503), the processing proceeds to step S504. If the volume of the print data is larger than the storable data volume of the memory unit 203 (NO in step S503), the processing proceeds to step S505.

In step S504, the CPU 202 stores the print data received from the external device 108 in the data storage area of the memory unit 203, and controls the printer unit 104 to print the print data stored in the data storage area of the memory unit 203. Thereafter, the printer unit 104 prints the print data, and the processing in FIG. 5 ends.

In step S505, the CPU 202 controls the external device 108 to display a warning message indicating that being in a degeneracy state, print takes a long time, and to display a button for a user to select whether to continue the print. In a case where the print is selected to continue by the user's instruction, the external device 108 transmits a selection signal indicating that the print is to be continued to the CPU 202. In a case where discontinuation of the print is selected, the external device 108 transmits a selection signal indicating that the print is not to be continued to the CPU 202.

In a case where the HDD 204 is in the normal state, the CPU 202 stores, as illustrated in FIG. 3A, the print data in the data storage areas of the memory unit 203 and the HDD 204, even if the volume of the print data is larger than the storable data volume of the memory unit 203. Thus, the print processing can be executed at high speed.

On the contrary, in a case where the HDD 204 has the functional failure, the CPU 202 stores, as illustrated in FIG. 3B, the print data only in the data storage area of the memory unit 203, if the volume of the print data is larger than the storable data volume of the memory unit 203. Thus, the print processing becomes slow.

In step S506, the CPU 202 refers to the selection signal from the external device 108, and determines whether to continue the print. If the selection signal indicates that the print is to be continued (YES in step S506), the processing proceeds to step S507. If the signal indicates that the print is not to be continued, the processing proceeds to step S508.

In step S507, the CPU 202 stores the print data only in the data storage area of the memory unit 203, and outputs the stored print data to the printer unit 104. Specifically, in a case where the storable data volume of the memory unit 203 is more than or equal to a predetermined value, the CPU 202 stores the print data received from the external device 108 in the data storage area of the memory unit 203, and continues reception of print data from the external device 108.

In a case where the storable data volume of the memory unit 203 is less than the predetermined value, the CPU 202 controls the external device 108 to interrupt transmission of print data, and outputs the print data stored in the data storage area of the memory unit 203 to the printer unit 104. The CPU 202 then deletes the print data stored in the data storage area of the memory unit 203, and controls the external device 108 to resume transmitting print data.

The CPU 202 repeats the above processing until the reception of all print data received from the external device 108 is completed. The CPU 202 outputs the print data stored in the data storage area of the memory unit 203 to the printer unit 104 after all the print data has been received. The printer unit 104 prints the input print data, and then the processing in FIG. 5 ends.

In step S508, the CPU 202 controls the printer unit 104 not to print the print data received from the external device 108, and the processing in FIG. 5 ends.

The CPU 202 stores the print data received from the external device 108 in the data storage areas of the HDD 204 and the memory unit 203, and controls the printer unit 104 to print the stored print data in the case where the HDD 204 is in the normal state.

FIG. 6 is a flowchart illustrating a method for controlling the normal copy function of the image forming apparatus 100 in the case where the HDD 204 has the functional failure. In the case where the HDD 204 has the functional failure, the image forming apparatus 100 receives the print data from the scanner unit 103 through the processing in FIG. 6 and prints the print data, if the print of the print data to be read by the scanner unit 103 is instructed.

In step S601, the CPU 202 controls the display unit 106 to display a warning message indicating that the copying takes a long time and a button to select whether to continue the print in the case where the HDD 204 has the functional failure. The user can select the button to select whether to continue the print.

In step S602, if the CPU 202 detects that the button to continue the print is selected (YES in step S602), the processing proceeds to step S603. If the CPU 202 detects that the button to discontinue the print is selected (NO in step S602), the processing proceeds to step S609.

In step S609, the CPU 202 controls the scanner unit 103 not to read print data and controls the printer unit 104 not to print the print data. The processing in FIG. 6 then ends.

In step S603, the CPU 202 controls the scanner unit 103 to start reading an image on a document to acquire print data. The scanner unit 103 starts reading the image on the document and acquires the print data, and transmits the print data to the CPU 202. The CPU 202 receives the print data read by the scanner unit 103 and stores the received print data in the data storage area of the memory unit 203.

In step S604, the CPU 202 determines whether the storable data volume of the memory unit 203 is more than or equal to the predetermined value. If the storable data volume of the memory unit 203 is more than or equal to the predetermined value (YES in step S604), the processing proceeds to step S605. If the storable data volume of the memory unit 203 is less than the predetermined value (NO in step S604), the processing proceeds to step S607.

In step S605, the CPU 202 determines whether the scanner unit 103 has completed reading all documents. If the CPU 202 determines that the scanner unit 103 has completed reading all the documents (YES in step S605), the processing proceeds to step S606. If the CPU 202 determines that the scanner unit 103 has not completed reading all the documents (NO in step S605), the processing proceeds to step S610.

In step S610, the CPU 202 controls the scanner unit 103 to continue reading the image on the document and acquiring print data of the image. The scanner unit 103 continues reading the print data and transmits the print data to the CPU 202. The CPU 202 stores the received print data in the data storage area of the memory unit 203, and the processing returns to step S604.

In step S607, the CPU 202 controls the scanner unit 103 to interrupt the reading of the image on the document and the acquiring of the print data, and outputs the print data stored in the data storage area of the memory unit 203 to the printer unit 104. The processing proceeds to step S608.

In step S608, the CPU 202 deletes the print data stored in the data storage area of the memory unit 203, and the processing returns to step S603. The CPU 202 controls the scanner unit 103 to resume the reading of the image on the document and acquiring the print data. Thereafter, the CPU 202 repeats the above processing until determining that the scanner unit 103 has completed the reading of all the documents in step S605.

In step S606, the CPU 202 outputs the print data stored in the data storage area of the memory unit 203 to the printer unit 104. The printer unit 104 prints the input print data. The processing in FIG. 6 then ends.

When the HDD 204 is in the normal state, the CPU 202 stores the print data received from the scanner unit 103 in the data storage areas of the HDD 204 and the memory unit 203, and controls the printer unit 104 to print the stored print data.

As described above, the image forming apparatus 100 performs the LAN printing function illustrated in FIG. 5 and the normal copy function illustrated in FIG. 6 in the case where the HDD 204 has the functional failure. In the case of the failure, the CPU 202 displays the warning message in advance to notify the user of the possibility that the print may take a long time. This improves user convenience.

In FIG. 6, in step S607, the CPU 202 outputs the read print data to the printer unit 104, in the case where the volume of the read print data is larger than the storable data volume of the memory unit 203. At this time, the CPU 202 may output the print data of pages, to the printer unit 104, obtained every time the scanner unit 103 reads.

In the above described example of the image forming apparatus 100, the user selects whether to continue the print if the print may take a long time in the case where the HDD 204 has the functional failure. However, the present disclosure is not limited to this example. In some cases, a plurality of image forming apparatuses 100 is connected to the external device 108. In step S505 of FIG. 5, a CPU 202 of one of the image forming apparatuses 100 can control the external device 108 to display buttons for selecting whether to continue print or to print the print data using another image forming apparatus 100 having a normal HDD 204. The CPU 202 of the one of the image forming apparatuses 100 executes the processing in step S507 if the continuation of the print is selected. If the print in the another image forming apparatus 100 is selected, the CPU 202 of the one of the image forming apparatuses 100 controls the printer unit 104 not to print the received print data. In this case, the another image forming apparatus 100 prints print data instead of the one of the image forming apparatuses 100.

In LAN printing, there is a data format in which the image forming apparatus 100 cannot determine the volume of print data until all the print data transmitted by the external device 108 has been received. In a case where the image forming apparatus 100 cannot acquire the volume of print data based on header information about the print data, the image forming apparatus 100 may control the external device 108 to display an error, control the printer unit 104 not to print the print data, and terminate the print.

As described above, in a case where the HDD 204 has the functional failure and the user can determine in advance that the print takes a long time, the user can select whether to continue the print, and thus the image forming apparatus 100 improves user-friendliness.

Various embodiments of the present disclosure can also be achieved by processing for supplying a program, which achieves one or more functions in the above exemplary embodiment, to a system or an apparatus via a network or a storage medium and causing one or more processors in a computer of the system or the apparatus to read the program and execute the read program. Further, various embodiments can also be achieved by a circuit that achieves one or more functions (for example, an application specific integrated circuit (ASIC)).

The above-described exemplary embodiment merely illustrates a specific example for carrying out the present disclosure, and the technical scope of the present disclosure must not be interpreted as being limited to the exemplary embodiment. That is, the present invention can be implemented in various forms and variations that depart from the above described embodiment without deviating from the technical idea or main features of the present disclosure.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-247628, filed Dec. 28, 2018, which is hereby incorporated by reference herein in its entirety.

What is claimed is:

1. An image forming apparatus comprising:
    a first storage unit that is a nonvolatile storage;
    a second storage unit that is a volatile storage;
    a notification unit configured to perform notification to a user; and
    a control unit configured to be able to
    perform first control, such that a print processing delay that is based on a volume of print data that is received being larger than a size of available memory space of the second storage unit does not occur, by storing the received print data into the first storage unit and the second storage unit and by causing a printer unit to print the stored print data, and
    perform second control, such that a print processing delay that is based on the volume of the print data that is received being larger than the size of available memory space of the second storage unit occurs, by storing the received print data into the second storage unit without storing the received print data into the first storage unit and by causing the printer unit to print the stored print data;
    wherein the control unit performs the second control in a case where the volume of print data received in a state in which the first storage unit has a functional failure is smaller than the size of the available memory space of the second storage unit, and
    wherein the control unit causes the notification unit to issue an alarm for a delay in print processing performed by the printer unit in a case where the volume of the print data received in the state in which the first storage unit has the functional failure is larger than the size of the available memory space of the second storage unit.

2. The image forming apparatus according to claim 1, wherein, as the alarm for the delay in the print processing, the control unit performs control to display a message indicating that there is a possibility that printing takes a long time.

3. The image forming apparatus according to claim 1, wherein the first storage unit is a hard disk drive, and
    wherein the second storage unit is a semiconductor memory.

4. The image forming apparatus according to claim 1, wherein, upon receiving the print data from an external device,
    the control unit checks, in the case where the first storage unit has the functional failure, whether or not the volume of the received print data is larger than a storable volume of the second storage unit.

5. The image forming apparatus according to claim 4, wherein the control unit acquires the volume of the print data based on header information about the received print data.

6. The image forming apparatus according to claim 1, wherein the control unit causes the notification unit to issue the alarm and perform notification for selecting whether or not to continue the printing in a case where the volume of the print data received in the state in which the first storage unit has the functional failure is larger than the size of the available memory space of the second storage unit.

7. The image forming apparatus according to claim 6, wherein the control unit, in a case where continuation of the print is selected in response to the displayed message:
    causes the print data received from the external device to be stored in the second storage unit,
    causes the external device to interrupt transmission of the print data,
    outputs the print data stored in the second storage unit to the printer unit,
    deletes the print data stored in the second storage unit, and
    causes the external device to resume the transmission of the print data, and
wherein the control unit, in a case where discontinuation of the print is selected in response to the displayed message,
    causes the printer unit not to print the received print data.

8. The image forming apparatus according to claim 6, wherein the control unit, in the case where the first storage unit has the functional failure,
    causes the print data received from the external device to be stored in the second storage unit, and
    causes the printer unit to print the print data stored in the second storage unit if the volume of the print data is less than or equal to the storable volume of the second storage unit.

9. The image forming apparatus according to claim 1, wherein the control unit receives print data from an external device, and
wherein the control unit, in the case where the first storage unit has the functional failure,
    causes an error to be displayed, and
    causes the printer unit not to print the print data if a volume of the print data cannot be acquired based on header information about the received print data.

10. The image forming apparatus according to claim 1, wherein the control unit causes the notification unit to issue the alarm and perform notification for selecting whether or not to perform the printing using another image forming apparatus in a case where the volume of the print data received in the state in which the first storage unit has the functional failure is larger than the size of the available memory space of the second storage unit, and, in a case where performing the printing using the another image forming apparatus is selected, the control unit performs control so as not to cause the printer unit to print the received print data.

11. The image forming apparatus according to claim 1, wherein the control unit performs the first control upon receiving print data when in a case where the first storage unit is in a normal state.

12. A method for controlling an image forming apparatus including a first storage unit that is a nonvolatile storage, a second storage unit that is a volatile storage, and a notification unit configured to perform notification to a user, the method comprising:
    by a control unit,
        performing first control, such that a print processing delay that is based on a volume of print data that is received being larger than a size of available memory space of the second storage unit does not occur, by storing the received print data into the first storage unit and the second storage unit and by causing a printer unit to print the stored print data, in a case where the first storage unit is in a normal state;
        performing second control, such that a print processing delay that is based on the volume of the received print data being larger than the size of the available memory space of the second storage unit occurs, by storing the received print data into the second storage unit without storing the received print data into the first storage unit and by causing the printer unit to print the stored print data, in a case where the volume of print data received in a state in which the first storage unit has a functional failure is smaller than the size of the available memory space of the second storage unit; and
    causing the notification unit to issue an alarm for a delay in print processing performed by the printer unit in a case where the volume of the print data received in the state in which the first storage unit has the functional failure is larger than the size of the available memory space of the second storage unit.

* * * * *